United States Patent
Kinpara et al.

(10) Patent No.: US 8,022,660 B2
(45) Date of Patent: Sep. 20, 2011

(54) CONTROL APPARATUS FOR AC ROTARY MACHINE

(75) Inventors: Yoshihiko Kinpara, Tokyo (JP); Masaki Kono, Tokyo (JP); Kiyoshi Eguchi, Tokyo (JP); Keita Hatanaka, Tokyo (JP); Mitsuo Kashima, Tokyo (JP); Kouichi Arisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 468 days.

(21) Appl. No.: 12/295,909

(22) PCT Filed: Jun. 29, 2006

(86) PCT No.: PCT/JP2006/312990
§ 371 (c)(1),
(2), (4) Date: Jan. 22, 2009

(87) PCT Pub. No.: WO2008/001445
PCT Pub. Date: Jan. 3, 2008

(65) Prior Publication Data
US 2009/0251083 A1   Oct. 8, 2009

(51) Int. Cl.
*H02P 27/00* (2006.01)
*H02P 3/18* (2006.01)
(52) U.S. Cl. ........ 318/812; 318/799; 318/800; 318/801; 318/432; 318/434
(58) Field of Classification Search ............ 318/812, 318/799–801, 432, 434
See application file for complete search history.

(56) References Cited

U.S. PATENT DOCUMENTS

| | | | |
|---|---|---|---|
| 6,759,827 B2 * | 7/2004 | Kawashima | 318/727 |
| 6,979,975 B1 | 12/2005 | Kinpara et al. | |
| 7,800,337 B2 * | 9/2010 | Kinpara et al. | 318/712 |
| 2008/0180054 A1 * | 7/2008 | Kinpara et al. | 318/720 |

FOREIGN PATENT DOCUMENTS

| | | |
|---|---|---|
| CN | 1588793 A | 3/2005 |
| JP | 63-077397 A | 4/1988 |
| JP | 5-4797 U | 1/1993 |
| JP | 08-130882 A | 5/1996 |
| JP | 09-140200 A | 5/1997 |
| JP | 2000-253505 A | 9/2000 |
| JP | 2002-369597 A | 12/2002 |
| JP | 2003-259699 A | 6/2003 |
| JP | 2003-259679 A | 9/2003 |
| JP | 2004-274845 A | 9/2004 |
| JP | 2005-080476 A | 3/2005 |
| JP | 2005-176571 A | 6/2005 |

* cited by examiner

*Primary Examiner* — Walter Benson
*Assistant Examiner* — Erick Glass
(74) *Attorney, Agent, or Firm* — Leydig, Voit & Mayer, Ltd.

(57) ABSTRACT

A control controls starting of an AC rotary machine by calculating a resistance drop component, corresponding to a resistance drop of the AC rotary machine, based on a detection current, and adjusts angular frequency of an AC output voltage based on subtracting the resistance drop component from a voltage command, and, simultaneously, adjusting amplitude of the AC output voltage so that amplitude of an AC phase current may change in conformity with a predetermined function.

12 Claims, 7 Drawing Sheets

CONTROL APPARATUS FOR AC ROTARY MACHINE

TECHNICAL FIELD

This invention relates to a control apparatus for an AC rotary machine wherein the AC rotary machine is controlled by employing a power inverter, and more particularly to a control apparatus for an AC rotary machine wherein a start control for starting the AC rotary machine in a free-run state or the like is performed.

BACKGROUND ART

In a control apparatus for an AC rotary machine wherein the variable speed control of the AC rotary machine is performed by a power inverter without employing any rotational angular velocity detector for the AC rotary machine, a cost and wiring which are required for the rotational angular velocity detector can be omitted. Since, however, the rotational angular velocity detector is not employed, the rotational velocity of the AC rotary machine cannot be known when the AC rotary machine starts in a free-run state, that is, in a state where the power inverter stops a power inversion operation and where the AC rotary machine is rotating at any desired rotational velocity, so that a stable start is difficult to be performed without generating large fluctuations in the torque and rotational velocity of the AC rotary machine.

A start method wherein an induction motor is started without employing any rotational angular velocity detector is disclosed in JP 63-77397A (Patent Document 1). In Patent Document 1, the instantaneous magnetic flux vector signal and instantaneous generation torque signal of the motor are calculated using switch state signals for commanding the respective phase output voltages of a power inverter, the voltage detection value of a DC voltage source and the current detection value of the motor, and three control flags are generated using the instantaneous magnetic flux vector signal and instantaneous generation torque signal of the motor. Owing to the combination of the three control flags, the switching state of the power inverter is designated so as to generate a voltage vector optimizing a torque response, the generation torque of the motor is controlled so as to follow up a command value, and a magnetic flux vector is controlled so as to depict an approximate circular locus, so that the induction motor is started from a free-run state. In the start control, the angular frequency of an AC voltage in the power inverter is set higher than the highest angular frequency which arises in a normal operation, and a switch 4 on the DC input side of the power inverter is thereafter closed to pull in the motor.
Patent Document 1: JP 63-77397A

DISCLOSURE OF THE INVENTION

Problems that the Invention is to Solve

In Patent Document 1, the instantaneous magnetic flux vector signal of the induction motor is calculated on the basis of a primary terminal voltage vector value, a primary terminal current vector and a primary winding resistance in the induction motor, and a voltage command for the power inverter is corrected so that this instantaneous magnetic flux vector signal may hold a desired value. However, in a case where the induction motor is arranged, for example, outdoors, its temperature fluctuates greatly, and by way of example, it is below the freezing point in midwinter and exceeds 100° C. in the overload continuous operation of the induction motor. A control apparatus in Patent Document 1 starts the induction motor by correcting the voltage command for the power inverter so that the instantaneous magnetic vector signal of the induction motor may hold the desired value under the temperature change of the induction motor. With the temperature change of the induction motor, however, a large change arises also in the amplitude of an AC phase current flowing through the induction motor, to incur the drawback that the AC phase current enlarges at the time of the start. In the worst case, a situation where a protective function is actuated occurs to bring about a situation where the start of the induction motor cannot be effected. Moreover, in the control apparatus in Patent Document 1, the voltage command for the power inverter is corrected so that the instantaneous magnetic flux vector signal may hold the desired value, and hence, the disorder of the output torque of the induction motor arises at the time of the start on account of the delay of the correction, to incur the drawback that a shock and a rotation number fluctuation take place.

This invention consists in proposing a control apparatus for an AC rotary machine as improves such drawbacks and as can effect a stable start.

Means for Solving the Problems

A control apparatus for an AC rotary machine according to this invention including: control means for generating a voltage command on the basis of a current command, and for generating a switching command on the basis of the voltage command; a power inverter which generates an AC output voltage that has its amplitude and its angular frequency controlled on the basis of the switching command; at least one AC rotary machine which is connected to said power inverter; and a current detector which outputs a detection current on the basis of an AC phase current that flows from said power inverter to said AC rotary machine;
wherein: said control means is configured so as to perform controls including a start control for said AC rotary machine; said control means operates in the start control to calculate a resistance drop component corresponding to a resistance drop of said AC rotary machine on the basis of the detection current, and to adjust the angular frequency of the AC output voltage on the basis of a subtraction output obtained by subtracting the resistance drop component from the voltage command; and said control means simultaneously operates in the start control to adjust an amplitude of the AC output voltage so that an amplitude of the AC phase current may change in conformity with a predetermined function.

Advantages of the Invention

In the control apparatus for the AC rotary machine according to this invention, the control means operates in the start control to calculate the resistance drop component corresponding to the resistance drop of the AC rotary machine on the basis of the detection current, and to adjust the angular frequency of the AC output voltage on the basis of the subtraction output obtained by subtracting the resistance drop component from the voltage command, so that the angular frequency of the AC output command of the power inverter can be adjusted without involving a delay as in a prior-art control apparatus wherein a voltage command for a power inverter is corrected so that an instantaneous magnetic flux vector signal may hold a desired value, and simultaneously, the amplitude of the AC output voltage of the power inverter is adjusted so that the amplitude of the AC phase current flowing from the power inverter to the AC rotary machine may change in conformity with the predetermined function, so that even under the temperature change of the AC rotary machine, the large change of the amplitude of the AC phase current is suppressed, and the AC rotary machine can be stably started.

BEST MODE FOR CARRYING OUT THE INVENTION

Now, several embodiments of this invention will be described with reference to the drawings.

Embodiment 1

Figure 1:
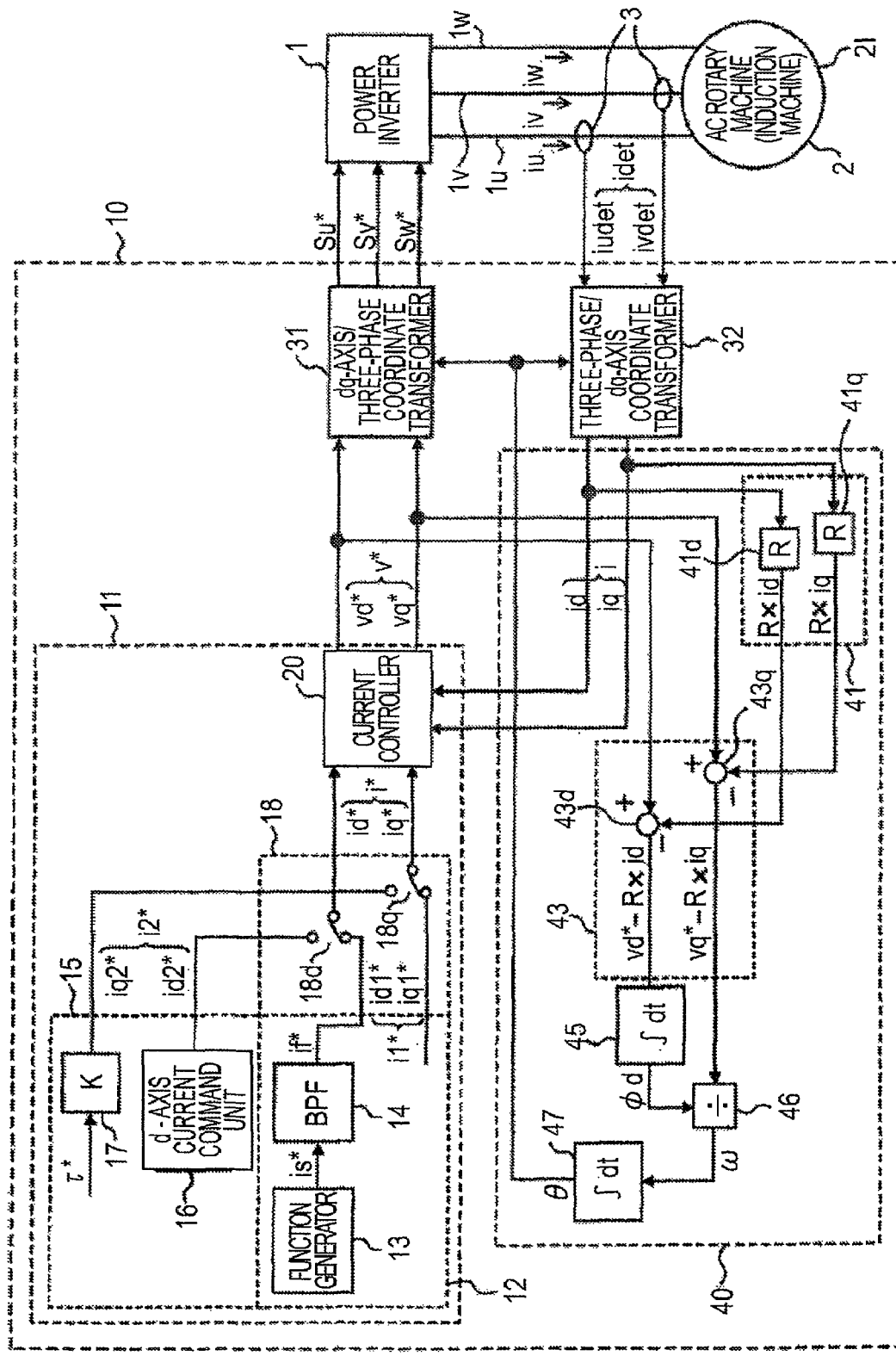
FIG. 1 is a block diagram showing Embodiment 1 of a control apparatus for an AC rotary machine according to this invention.

FIG. 1 is a block diagram showing Embodiment 1 of a control apparatus for an AC rotary machine according to this invention. The control apparatus for the AC rotary machine in Embodiment 1 includes a power inverter 1, the AC rotary machine 2, current detector 3, and a control means 10. The power inverter 1 is, for example, a three-phase power inverter, which performs the power inversion between a DC power and a three phase AC power. The power inverter 1 includes three-phase inversion circuits U, V and W which are connected to a DC power source in parallel with one another. As is well known, each of the inversion circuits U, V and W includes a pair of switches on a plus side and a minus side, and AC power feed lines 1$u$, 1$v$ and 1$w$ of the three phases are connected between the pairs of switches of the respective inversion circuits.

The power inverter 1 is concretely configured as a three-phase power inverter of variable-voltage and variable-frequency type. This power inverter 1 receives switching commands Su*, Sv* and Sw* from the control means 10, and when it inverts the DC power into the three-phase AC power, it generates the three-phase AC power having controlled output voltage and controlled angular frequency, on the basis of the switching commands Su*, Sv* and Sw*. The switching commands Su*, Sv* and Sw* are respectively fed to the inversion circuits of the U-phase, V-phase and W-phase, and they turn ON and OFF the pairs of switches of the respective inversion circuits in controlled phases.

In Embodiment 1, the AC rotary machine 2 is an AC induction machine 2I, concretely an induction motor of the three phases, and it is connected to the power inverter 1 through the AC power feed lines 1$u$, 1$v$ and 1$w$ of the three phases. The current detector 3 is arranged in, for example, the AC power feed lines 1$u$ and 1$v$, and it generates a detection current idet on the basis of AC phase currents flowing from the power inverter 1 to the AC induction machine 2I, that is, a U-phase current iu and a V-phase current iv. The detection current idet contains a U-phase detection current component iudet and a V-phase detection current component ivdet. The U-phase detection current component iudet corresponds to the U-phase current iu flowing through the U-phase AC power feed line 1$u$, while the V-phase current component ivdet corresponds to the V-phase detection current iv flowing through the V-phase AC power feed line 1$v$. In Embodiment 1, the AC rotary machine 2 is the AC induction machine 2I, and hence, AC phase currents iu, iv and iw which flow from the power inverter 1 to the AC induction machine 2I in the start period of the AC rotary machine become excitation currents for the AC induction machine 2I.

The control means 10 includes voltage command generation means 11, coordinate transformers 31 and 32, and phase signal generation means 40. The voltage command generation means 11 generates a voltage command v* on rotating two-axis coordinates which include a d-axis and a q-axis intersecting orthogonally. The voltage command v* contains a d-axis voltage command vd* and a q-axis voltage command vq*. The voltage command generation means 11 includes start current command means 12, post-start current command means 15, changeover means 18, and a current controller 20.

The start current command means 12 is used when the start control of the AC induction machine 2I is performed by the control means 10. At the time when the power inverter 1 stops a power inversion operation and when the AC induction machine 2I is in a free-run state, the start control is used for starting the power inverter 1 and beginning the power inversion operation thereof, so as to start the AC induction machine 2I by the power inverter 1. This start control is executed in that period of the start period SP before an armature magnetic flux φ rises in the AC induction machine 2I. The start period SP is concretely several tens milliseconds to several hundred milliseconds, and it is set at, for example, 100 milliseconds, namely 100 (msec) in Embodiment 1. The start current command means 12 generates a start current command i1* in the start period SP.

The start current command means 12 includes a function generator 13 and a band-pass filter 14, and it generates the start current command i1*. The start current command i1* contains a d-axis start current command id1* and a q-axis start current command iq1*. The band-pass filter 14 is connected to the function generator 13, and it generates the d-axis start current command id1*. The q-axis start current command iq1* is made, for example, zero in Embodiment 1, and iq1*=0 holds. The q-axis start current command iq1*=0 is given from outside.

The post-start current command means 15 is used instead of the start current command means 12 by changing-over the changeover means 18 after the completion of the start. The post-start current command means 15 generates a post-start current command i2*. The post-start current command i2* contains a d-axis current command id2* and a q-axis current command iq2*. The post-start current command means 15 has a d-axis current command unit 16 and a proportional gain multiplier 17. The d-axis current command unit 16 generates the post-start d-axis current command id2*. The proportional gain multiplier 17 receives a torque command τ*, and it multiplies the torque command τ* by a proportional gain K, thereby to generate the q-axis current command iq2*. That is, iq2*=τ*×K holds.

The changeover means 18 performs changeover from the start current command means 12 to the post-start current command means 15 after the lapse of the start period SP. In the start period SP, the changeover means 18 feeds the start current command i1* as a current command I* from the start current command means 12 to the current controller 20, and after the lapse of the start period SP, it feeds the current command i2* as the current command I* from the post-start current command means 15 to the current controller 20. The changeover means 18 includes a d-axis changeover switch 18d and a q-axis changeover switch 18q. The d-axis changeover switch 18d performs the changeover between the d-axis start current command id1* and the post-start d-axis current command id2*. The q-axis changeover switch 18q performs the changeover between the q-axis start current command iq1* and the post-start q-axis current command iq2*. The changeover switches 18d and 18q are changed-over in interlocking with each other. In the start period SP, the changeover switch 18d selects the d-axis start current command id1* and feeds this d-axis start current command id1* to the current controller 20 as a d-axis current command id*, while the changeover switch 18q selects the q-axis start current command iq1* and feeds this q-axis start current command iq1* to the current controller 20 as a q-axis current command iq*. After the start period SP has lapsed, both the changeover switches 18d and 18q are changed-over, and the changeover switch 18d selects the post-start d-axis current command id2* and feeds this d-axis current command id2* to the current controller 20 as the d-axis current command id*, while the changeover switch 18q selects the post-start q-axis current command iq2* and feeds this q-axis current command iq2* to the current controller 20 as the q-axis current command iq*.

Figure 2A:
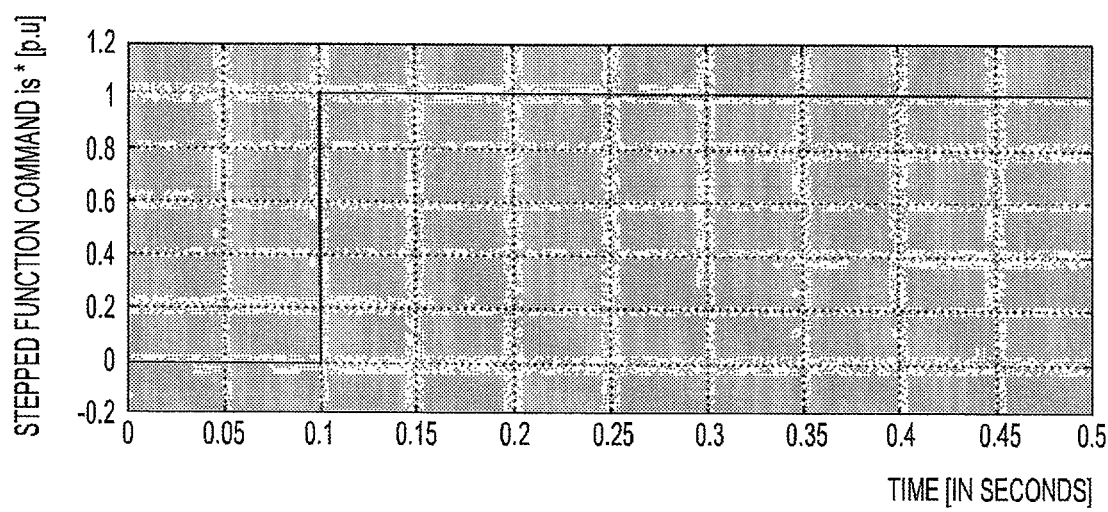
FIGS. 2A, 2B are waveform diagrams showing the output waveforms of a function generator and a band-pass filter in Embodiment 1.
Figure 2B:
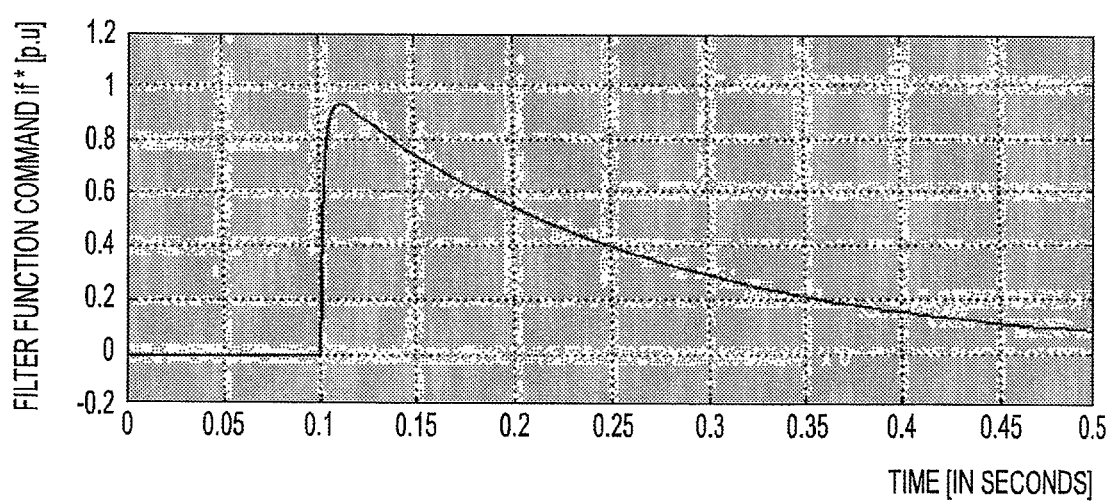

FIG. 2A shows a stepped function command is* which is outputted from the function generator 13 of the start current command means 12, while FIG. 2B exemplifies a filter function command if* which is outputted from the band-pass filter 14 on the basis of the stepped function command is*. In Embodiment 1, the filter function command if* is outputted as the d-axis start current command id1*. In FIGS. 2A and 2B, the axes of abscissas are a common time axis. The stepped function command is* from the function generator 13 is in a stepped waveform which rises at a time of 0.1 (second), but the filter function command if* which is outputted from the band-pass filter 14 decreases with the lapse of time. In Embodiment 1, the control range of the angular frequency of the AC induction machine 2I has been set at 1 to 60 (Hz), and also the pass bandwidth of the band-pass filter 14 has been set at 1 to 60 (Hz) in conformity therewith.

In an apparatus in which the band-pass filter 14 is not used, the stepped function command is* from the function generator 13 is fed to the current controller 20 as the d-axis start current command id1*. However, in a case, for example, where the AC rotary machine 2 is the AC induction machine 2I and where this AC induction machine 2I is started, it suffices to command a voltage and a current which contain the rotational angular frequency component of the AC induction machine 2I, and the AC induction machine 2I can be started without feeding any frequency component other than the frequency necessary for the commands. With the stepped function command is* from the function generator 13 as shown in FIG. 2A, an amplitude becomes equal for all frequency bands, but the filter function command if* which is outputted from the band-pass filter 14 extracts only the frequency bandwidth necessary for the start, so that the current amplitude of the power inverter 1 can be suppressed smaller than in the apparatus in which the stepped function command is* from the function generator 13 is used as the d-axis start current command id1*.

In such a case where the current bearing capacity characteristic of the power inverter 1 is tolerant against a current generated in a short time, the d-axis start current command id1* of larger magnitude can be given by setting the filter function command if* from the band-pass filter 14 as the d-axis start current command id1*, than by setting the stepped function command is* from the function generator 13 as the d-axis start current command id1*, whereby the precision of the detection current idet to be obtained from the AC rotary machine 2 is enhanced more, and the precision of the calculation of the angular frequency ω by the phase signal generation means 40 can be enhanced more. In this manner, the band-pass filter 14 generates the filter function command if* with the unnecessary signal components cut, so that the AC rotary machine 2 can be efficiently started without feeding any wasteful current command component unnecessary for the start, in the start period SP.

Incidentally, although the function generator 13 has been described as generating the stepped function command is*, an M-series signal or a pseudo-noise signal utilizing a random number table can also be generated instead of the stepped function command is*. Also in this case, the band-pass filter passes only the frequency component necessary for the start and generates the filter function command if*, so that the start can be efficiently effected without feeding any wasteful current component for the start.

The coordinate transformer 31 is a coordinate transformer from the rotating two-axis coordinates which include the d-axis and q-axis intersecting orthogonally, into the three-phase time coordinates, and it receives the voltage command v* and generates the switching commands Su*, Sv* and Sw*. The switching commands Su*, Sv* and Sw* are fed to the power inverter 1. The coordinate transformer 32 is a coordinate transformer from the three-phase time coordinates into the rotating two-axis coordinates which include the d-axis and q-axis intersecting orthogonally, and it receives the detection current idet from the current detector 3 and transforms them into detection current i on the rotating two-axis coordinates which include the d-axis and q-axis intersecting orthogonally. The detection current i on the rotating two-axis coordinates contains a d-axis detection current id and a q-axis detection current iq.

Both the d-axis detection current id and the q-axis detection current iq are fed to the current controller 20 of the voltage command generation means 11. The current controller 20 receives the d-axis detection current id and q-axis detection current iq together with the d-axis current command id* and q-axis current command iq*, and it generates the d-axis voltage command vd* and q-axis voltage command vq* so as to equalize the d-axis detection current id to the d-axis current command id* and to equalize the q-axis detection current iq to the q-axis current command iq*.

As stated before, in the start period SP, the control means 10 uses the start current command means 12, it generates the voltage command v* on the basis of the start current command i1* of the start current command means 12, and it generates the switching commands Su*, Sv* and Sw* by the coordinate transformer 31 on the basis of the voltage command v*, so as to start the power inverter 1. In this start period SP, the AC phase currents iu, iv and iw which flow from the power inverter 1 to the AC induction machine 2I become the excitation currents for the AC induction machine 2I, and the amplitude of the AC phase currents iu, iv and iw is determined by the start current command i1*. In the start current command i1*, the d-axis start current command id1* is set as the filter function command if* outputted from the band-pass filter 14, and the q-axis current command iq1* is set at zero.

Letting "ia" denote the amplitude of the AC phase currents iu, iv and iw, the amplitude ia is expressed by the following formula (1):

$$ia = a \times \{(id^*)^2 + (iq^*)^2\}^{1/2} \quad (1)$$

Here, "a" denotes a constant.

In the start period SP, id1*=id* holds, and iq1*=iq*=0 holds, so that the amplitude ia becomes the following formula (2):

$$ia = a \times id1^* \quad (2)$$

In other words, the amplitude of the AC phase currents iu, iv and iw is determined by the d-axis start current command id1* as indicated by Formula (2). In a case where the AC rotary machine 2 such as the AC induction machine 2I is arranged, for example, outdoors, its temperature fluctuates greatly, and by way of example, it is below the freezing point in midwinter and exceeds 100° C. in the overload continuous operation of the AC rotary machine 2, so that the armature resistance R of the AC rotary machine 2 fluctuates greatly with the change of the temperature. In Embodiment 1, however, the amplitude of the AC phase currents iu, iv and iw is determined by the d-axis start current command id1* in the start period SP, thereby to perform a current control by the current controller 20, so that the temperature change of the AC rotary machine 2 is not influential. In the start period SP, accordingly, the amplitude of the AC phase currents iu, iv and iw does not change greatly with the temperature change of the AC rotary machine 2, a situation where a protective function operates does not occur, and the AC rotary machine 2 can be stably started.

Next, the phase signal generation means 40 will be described. This phase signal generation means 40 includes means 41 for calculating the resistance drop of the AC rotary machine 2, subtraction means 43, an integrator 45, a divider 46, and an integrator 47. The resistance drop calculation means 41 includes a d-axis resistance drop calculator 41*d*, and a q-axis resistance drop calculator 41*q*. The d-axis resistance drop calculator 41*d* is fed with the d-axis detection current id from the coordinate transformer 32, and it multiplies this d-axis detection current id by the armature resistance R of the AC rotary machine 2, thereby to output a d-axis resistance drop component (R×id). The q-axis resistance drop calculator 41*q* is fed with the q-axis detection current iq from the coordinate transformer 32, and it multiplies this q-axis detection current iq by the armature resistance R of the AC rotary machine 2, thereby to output a q-axis resistance drop component (R×iq).

The subtraction means 43 includes a d-axis subtractor 43*d*, and a q-axis subtractor 43*q*. The d-axis subtractor 43*d* is fed with the d-axis voltage command vd* from the current controller 20, and with the d-axis resistance drop component (R×id) from the d-axis resistance drop calculator 41*d*. This d-axis subtractor 43*d* subtracts the d-axis resistance drop component (R×id) from the d-axis voltage command vd*, thereby to deliver the subtraction output (vd*−R×id) between them. The q-axis subtractor 43*q* is fed with the q-axis voltage command vq* from the current controller 20, and with the q-axis resistance drop component (R×iq) from the q-axis resistance drop calculator 41*q*. This q-axis subtractor 43*q* subtracts the q-axis resistance drop component (R×iq) from the q-axis voltage command vq*, thereby to deliver the subtraction output (vq*−R×iq) between them.

The integrator 45 is fed with the subtraction output (vd*−R×id) from the d-axis subtractor 43*d*. The integrator 45 integrates this subtraction output (vd*−R×id), and delivers an integral output φd. This integral output φd corresponds to a d-axis component φd at the time when the armature magnetic flux φ of the AC rotary machine 2 is decomposed into the d-axis component φd and a q-axis component φq on the rotating two-axis coordinates which include the d-axis and q-axis intersecting orthogonally, and when the q-axis component φq is made zero. The divider 46 is fed with the subtraction output (vq*−R×iq) from the q-axis subtractor 43*q*, and with the integral output φd from the integrator 45. The divider 46 divides the subtraction output (vq*−R×iq) by the integral output φd, thereby to generate a division output ω. That is, the division output ω is expressed by the following formula (3):

$$\omega = (vq^* - R \times iq)/\phi d \quad (3)$$
$$= (vq^* - R \times iq) / \int (vd^* - R \times id)$$

This division output ω corresponds to the angular frequency ω of the AC output voltage which is outputted from the power inverter 1 when the q-axis component φq of the armature magnetic flux φ of the AC rotary machine 2 is made zero.

The integrator 47 is fed with the division output ω from the divider 46, and it integrates this division output ω, thereby to generate a phase signal θ. This division output ω corresponds to the phase θ of the AC output voltage which is outputted from the power inverter 1 when the q-axis component φq of the armature magnetic flux φ of the AC rotary machine 2 is made zero. This phase signal θ is fed to the coordinate transformers 31 and 32. Using the phase signal θ, the coordinate transformer 31 transforms the voltage command v* on the rotating two-axis coordinates which include the d- and q-axes intersecting orthogonally, into the switching commands Su*, Sv* and Sw* on the three-phase time coordinates, and using the phase signal θ, the coordinate transformer 32 transforms the detection currents iudet and ivdet on the three-phase time axis, into the detection currents id and iq on the d- and q-axes of the rotating two-axis coordinates which include the d- and q-axes intersecting orthogonally.

In this manner, in the phase signal generation means 40, the d-axis resistance drop component (R×id) and q-axis resistance drop component (R×iq) of the AC rotary machine 2 are calculated on the basis of the detection current idet detected by the current detector 3, the d-axis resistance drop component (R×id) and q-axis resistance drop component (R×iq) are respectively subtracted from the d-axis voltage command vd* and q-axis voltage command vq*, and the angular frequency ω of the AC phase currents iu, iv and iw flowing to the AC rotary machine 2 is calculated on the basis of the subtraction outputs (vd*−R×id) and (vq*−R×iq), so that the angular frequency of the AC output voltage to be outputted from the power inverter 1 can be adjusted so as to agree with the angular frequency of the AC phase currents iu, iv and iw flowing to the AC rotary machine.

The angular frequency ω which is calculated by the phase signal generation means 40 will be further described. In a case where the rotating two-axis coordinates which include the d-axis and q-axis intersecting orthogonally are rotating at any desired angular frequency ω, the d-axis component φd and q-axis component φq of the armature magnetic flux φ of the AC rotary machine 2 are expressed by the following formulas (4) and (5):

$$\phi d = \int(vd^* - R \times id + \omega \times \phi q)dt \quad (4)$$

$$\phi q = \int(vq^* - R \times iq - \omega \times \phi d)dt \quad (5)$$

Here, "vd*" and "vq*" denote the voltage commands on the rotating two-axis coordinates as are generated by the current controller 20 of the voltage command generation means 11, and "id" and "iq" denote the detection currents obtained in such a way that the detection currents iudet and ivdet which correspond to the AC phase currents iu and iv flowing to the AC rotary machine 2 are transformed onto the rotating two-axis coordinates by the coordinate transformer 32.

Besides, the output torque τm of the AC rotary machine 2 is expressed by the following formula (6):

$$\tau m = Pm \times (\phi d \times iq - \phi q \times id) \quad (6)$$

Here, "Pm" denotes the number of pair poles of the AC rotary machine 2.

In a case where the d-axis direction of the rotating two-axis coordinates and the direction of the armature magnetic flux φ are in agreement, the q-axis component φq of the armature magnetic flux φ becomes zero, and φq=0 holds. When φq=0 is therefore substituted into Formulas (4) and (5), respectively, the following formulas (7), (8) and (9) are obtained:

$$\phi d = \int(vd^* - R \times id)dt \quad (7)$$

$$vq^* - R \times iq - \omega \times \phi d = 0 \quad (8)$$

$$\omega = (vq^* - R \times iq) \div \phi d \quad (9)$$

In other words, when the rotating two-axis coordinates which include the d- and q-axes intersecting orthogonally are rotated in synchronism with the angular frequency ω calculated in conformity with Formulas (7), (8) and (9), the d-axis direction of the rotating two-axis coordinates and the direction of the armature magnetic flux φ can be brought into agreement, and the q-axis component φq of the armature magnetic flux φ can be made zero, that is, φq=0 can be held.

The phase signal generation means 40 calculates the angular frequency ω in conformity with Formulas (7), (8) and (9). The d-axis subtractor 43d calculates (vd*−R×id) in Formula (7), and the integrator 45 calculates the d-axis component φd of the armature magnetic flux φ as is expressed by Formula (7). The q-axis subtractor 43q calculates (vq*−R×iq) in Formula (9), and the divider 47 calculates the angular frequency ω expressed by Formula (9). The phase signal θ is calculated on the basis of the angular frequency ω, and it controls the coordinate transforms of the coordinate transformers 31 and 32. As a result, therefore, the rotating two-axis coordinates which include the d- and q-axes intersecting orthogonally are rotated in synchronism with the angular frequency ω calculated in conformity with Formula (9), the d-axis direction of the rotating two-axis coordinates and the direction of the armature magnetic flux φ can be brought into agreement, and the q-axis component φq of the armature magnetic flux φ can be made zero, that is, φq=0 can be held. The angular frequency of the AC output voltage to be outputted from the power inverter 1 is controlled so as to equalize to the rotational angular frequency of the rotating two-axis coordinates, in correspondence with the rotational angular frequency ω of the rotating two-axis coordinates, so that the angular frequency of the AC output voltage to be outputted from the power inverter 1 is adjusted so as to agree with the angular frequency of the AC phase currents iu, iv and iw flowing to the AC rotary machine.

In addition, in Embodiment 1, simultaneously with the control of the angular frequency of the AC output voltage to be outputted from the power inverter 1, the start current command circuit 12 feeds the q-axis start current command iq1*=0 to the current controller 20 as the q-axis current command iq* in the start period SP. In the start period SP, accordingly, the command iq* is also made zero together with the component φq. That is, iq*=0 holds, and φq=0 holds. In the start period SP, therefore, (φd×iq−φq×id) in Formula (6) becomes zero, and the output torque τm of the AC rotary machine 2 becomes zero, that is, τm=0 is held.

As described above, in Embodiment 1, the angular frequency ω of the rotating two-axis coordinates is controlled by the phase signal θ for the coordinate transformers 31 and 32, so that the angular frequency of the AC output voltage to be outputted from the power inverter 1 can be brought into agreement with the angular frequency of the AC phase currents iu, iv and iw flowing to the AC rotary machine 2, without any delay. Simultaneously, in the start period SP, the output torque τm of the AC rotary machine 2 is made zero, and the AC rotary machine 2 in a free-run state is started, whereby the output torque of the AC rotary machine 2 is prevented from fluctuating in the start period SP, and the occurrences of a shock and a rotation number fluctuation in the AC rotary machine 2 can be suppressed. In the prior-art control apparatus disclosed in Patent Document 1, the angular frequency of the output voltage of the power inverter is corrected on the basis of the angular frequency ω, and hence, a shaft deviation arises due to the delay of the correction. In contrast, in Embodiment 1, the shaft deviation ascribable to the delay of the correction is eliminated, and the AC rotary machine 2 can be started with the shock and the rotation number fluctuation suppressed.

Besides, in Embodiment 1, the start current command i1* to be fed to the current controller 20 is afforded from the start current command circuit 12 irrespective of the armature resistance R of the AC rotary machine 2, so as to determine the amplitude of the AC phase currents iu, iv and iw. Accordingly, even when the armature resistance R of the AC rotary machine 2 has changed depending upon the temperature condition of the AC rotary machine 2, the start current command i1* is not influenced by the armature resistance R. Accordingly, even when the armature resistance R of the AC rotary machine 2 has changed with the temperature condition of the AC rotary machine 2 in the start period SP, the amplitude of the AC currents flowing to the AC rotary machine 2 does not fluctuate, with the result that the situation where the protective function for overcurrent protection or the like operates can be avoided in the start period SP, to effect a stable start.

Besides, in Embodiment 1, the start is effected in such a way that the q-axis start current command iq1* in the start period SP is held at zero by the start current command means 12, and that the initial value of the q-axis voltage command vq* in the start period SP as is generated by the current controller 20 is made zero. In this case, at the start time point of the start period SP, iq1*=0 and vq*=0 hold. At the start time point of the start period SP, accordingly, also the subtraction output (vq*−R×iq) of the q-axis subtractor 43q becomes zero, and also the division output ω of the divider 46 becomes zero. In other words, the angular frequency ω becomes zero at the start time point of the start period SP, and this angular frequency ω rises with the lapse of the start period SP.

In the control apparatus disclosed in Patent Document 1, at the start time point of the start period, the angular frequency of the power inverter is set to be higher than the highest angular frequency which arises in the normal operation of the power inverter. At the start time point of the start period, therefore, the angular frequency of the power inverter needs to be set at the frequency higher than the highest angular frequency after it is set to be either plus or minus, with the result that a start response becomes different in accordance with the rotating direction of the AC rotary machine. In Embodiment 1, the start is performed by making the angular frequency ω of the power inverter 1 zero at the start time point of the start period SP, so that the stable start can be always effected irrespective of the rotating direction of the AC rotary machine 2.

Incidentally, although the q-axis start current command iq1* is held at zero in the start period SP in Embodiment 1, a similar advantage can be obtained even when the q-axis start current command iq1* is held at a predetermined value other than zero in the start period SP. In this case, the d-axis component φd of the armature magnetic flux φ enlarges from zero with the increase of the d-axis start current command id1*, and the output torque τm of the AC rotary machine 2 enlarges with the increase of the d-axis component φd of the armature magnetic flux. In the start period SP, however, the d-axis start current command id1* enlarges from zero, with the result that also the output torque τm of the AC rotary machine 2 enlarges from zero, and the AC rotary machine 2 can be stably started with a large shock and a sudden rotation number fluctuation suppressed.

Embodiment 2

Embodiment 1 consists in starting the AC rotary machine 2 when the AC rotary machine 2 is in its free-run state, whereas Embodiment 2 consists in starting the AC rotary machine 2 when whether the AC rotary machine 2 is in its free-run state or its stop state cannot be discriminated. The control means 10 has the same configuration as in Embodiment 1, and it starts the power inverter 1 so as to start the AC rotary machine 2. A start control at the time when the AC rotary machine 2 is in the free-run state is the same as in Embodiment 1, and also in a case where the AC rotary machine 2 is in the stop state, a stable start can be effected in the same manner as in Embodiment 1.

When the AC rotary machine 2 is in the stop state, the rotational angular frequency of the AC rotary machine 2 is zero at the start time point of the start period SP, and also the angular frequency ω calculated by the phase signal generation means 40 becomes zero, but with the start of the power inverter 1, the armature magnetic flux φ of the AC rotary machine 2 rises gradually, and the stable start can be effected.

Embodiment 3

Figure 3:
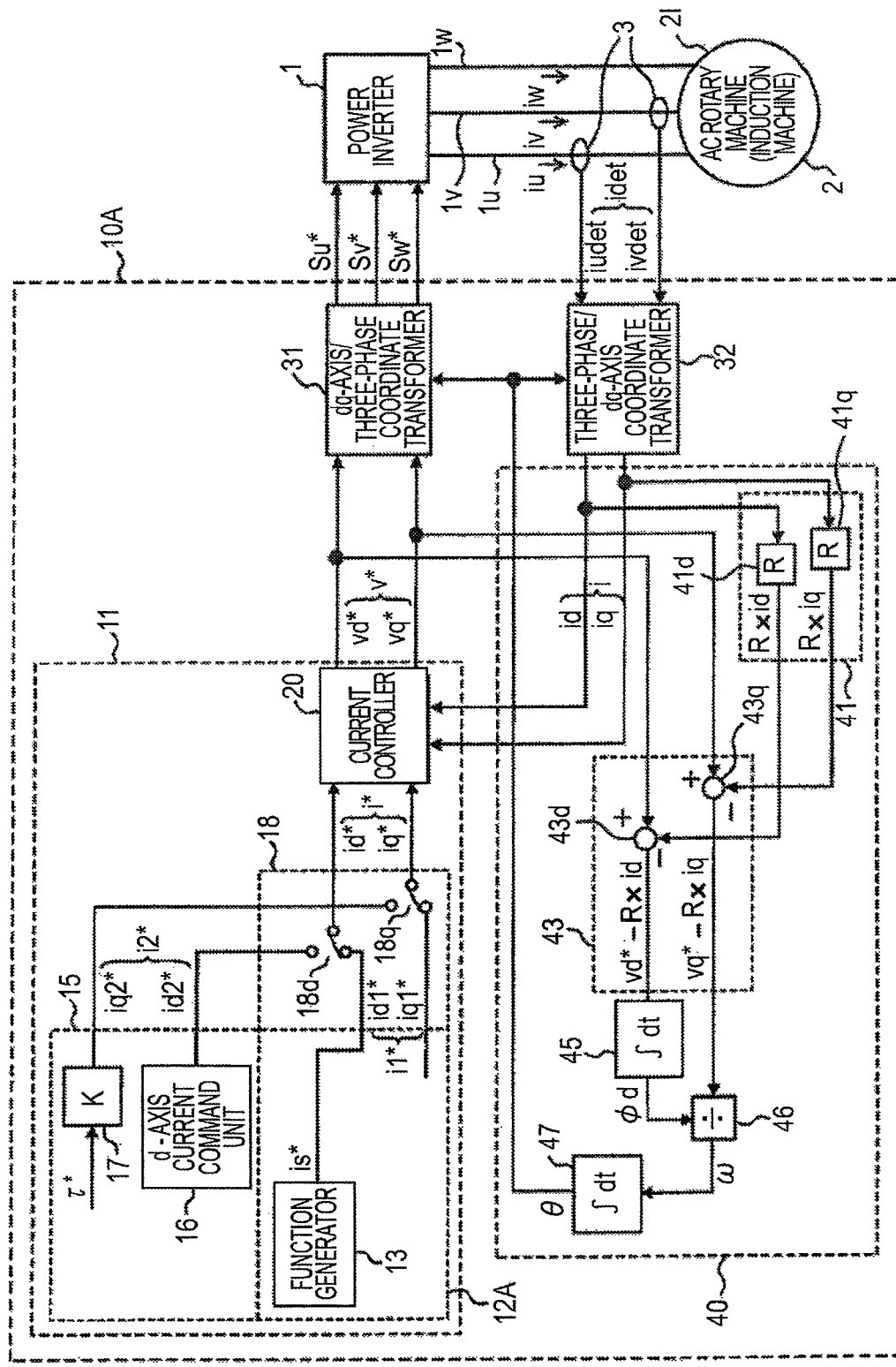
FIG. 3 is a block diagram showing Embodiment 3 of a control apparatus for an AC rotary machine according to this invention.

FIG. 3 is a block diagram showing Embodiment 3 of a control apparatus for an AC rotary machine according to this invention. Embodiment 3 is such that the control means 10 in Embodiment 1 is replaced with control means 10A, in which the start current command means 12 in Embodiment 1 is replaced with start current command means 12A. In this start current command means 12A, a band-pass filter 14 is removed, and a stepped function command is* is fed from the function generator 13 to the current controller 20 through the d-axis changeover switch 18d of changeover means 18 as the d-axis start current command id1*. The others are the same in configuration as in Embodiment 1 or 2.

In Embodiment 3, the wasteful component of the start current command id1* cannot be cut by the band-pass filter 14, but the same advantages as in Embodiment 1 or 2 can be obtained as to the others.

Embodiment 4

Figure 4:
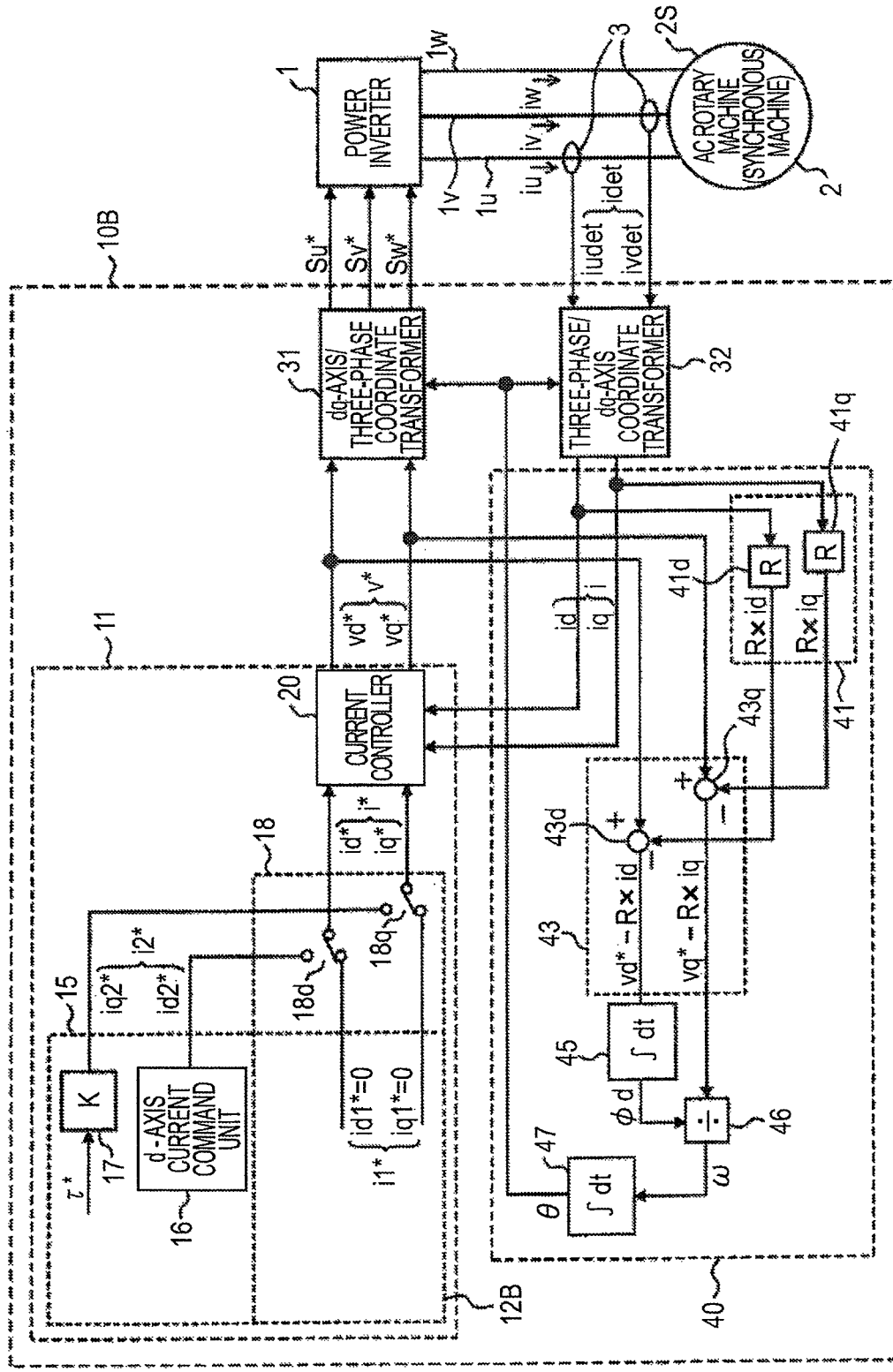
FIG. 4 is a block diagram showing Embodiment 4 of a control apparatus for an AC rotary machine according to this invention.

FIG. 4 is a block diagram showing Embodiment 4 of a control apparatus for an AC rotary machine according to this invention. In Embodiment 4, a synchronous machine 2S is used as the AC rotary machine 2. This synchronous machine 2S is concretely a three-phase synchronous motor by way of example.

Even when the AC rotary machine 2 is the synchronous machine 2S, Formula (1) to Formula (9) hold similarly, so that the same start control as in Embodiment 1 can be basically performed also in Embodiment 4. In Embodiment 4, with the use of the synchronous machine 2S, the control means 10 in Embodiment 1 is replaced with control means 10B, in which the start current command means 12 in Embodiment 1 is replaced with start current command means 12B. In this start current command means 12B, the q-axis start current command iq1* is made zero, and also the d-axis start current command id1* is made zero, that is, id1*=0 holds, and this command id1*=0 is fed to the current controller 20 through the d-axis changeover switch 18d of changeover means 18. The q-axis start current command iq1*=0 is fed to the current controller 20 through the q-axis changeover switch 18q of the changeover means in the same manner as in Embodiment 1. The others are the same in configuration as in Embodiment 1.

The AC rotary machine 2 is the induction machine 2I in Embodiment 1, and for starting the induction machine 2I which is in the free-run state, it is necessary to feed the voltage and current of the rotational angular velocity component to the induction machine 2I. In case of starting the synchronous machine 2S in its free-run state, however, an induced voltage caused by a rotor is generated in the synchronous machine 2S, and hence, the voltage and current of the rotational angular velocity component need not be fed from the power inverter 1, so that the d-axis start current command id1* is held at zero. In starting the synchronous machine 2S, at the start time point of the start period SP thereof, AC phase currents iu, iv and iw flow so as to cancel out the induced voltage generated in the synchronous machine 2S, in a very short time. In the same manner as in Embodiment 1, therefore, phase signal generation means 40 calculates the angular frequency ω on the basis of the AC phase currents iu, iv and iw, and the angular frequency of the AC output voltage of the power inverter 1 is controlled on the basis of the angular frequency ω. In Embodiment 4, the d-axis start current command id1* is made zero, whereby the synchronous machine 2S can be efficiently started without feeding any wasteful current to the synchronous machine 2S. Incidentally, although the q-axis start current command iq1* is made zero in the same manner as in Embodiment 1, it can also be made a predetermined value other than zero.

Embodiment 5

Figure 5:
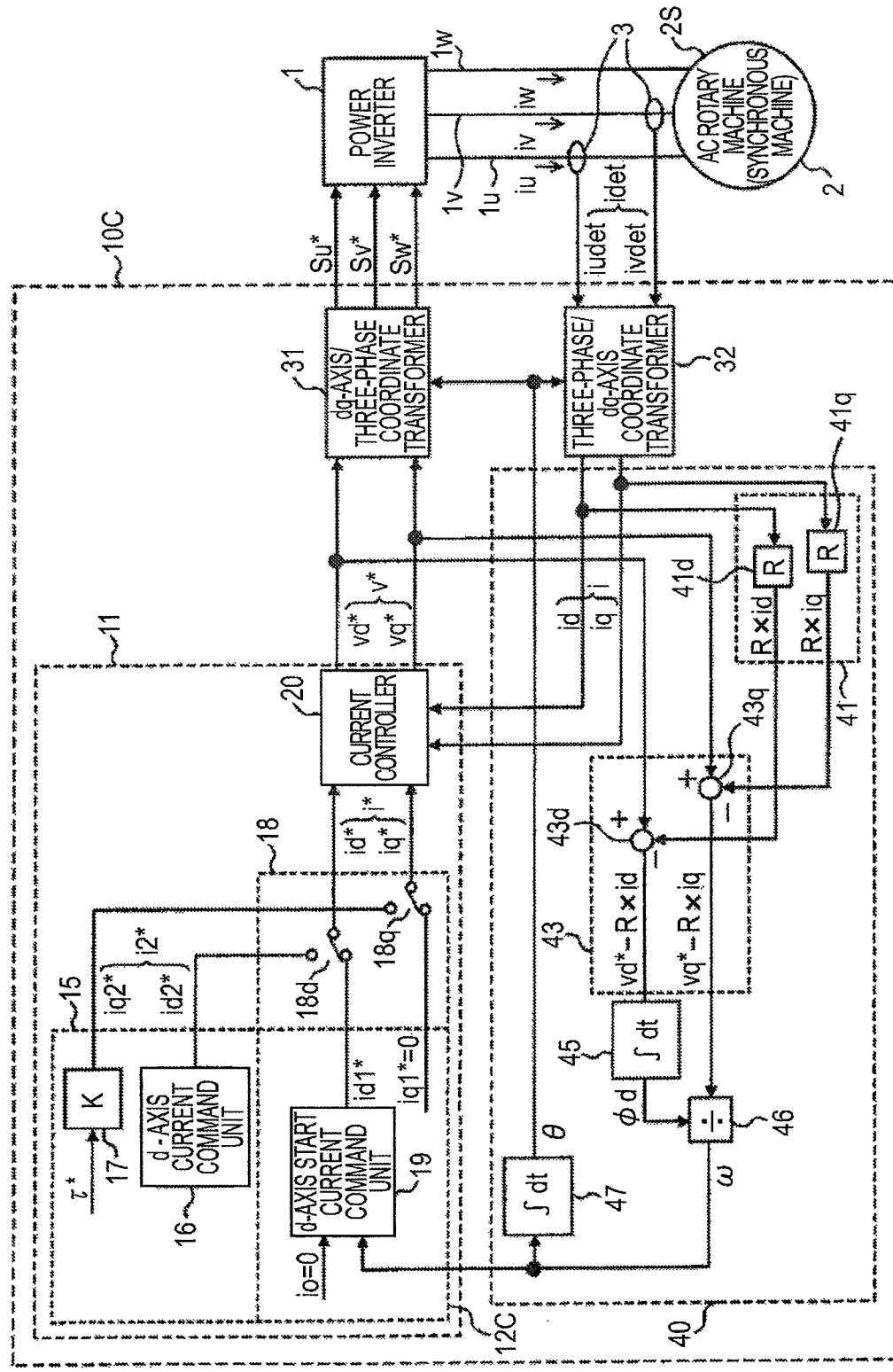
FIG. 5 is a block diagram showing Embodiment 5 of a control apparatus for an AC rotary machine according to this invention.

FIG. 5 is a block diagram showing Embodiment 5 of a control apparatus for an AC rotary machine according to this invention. Also Embodiment 5 uses a synchronous machine 2S as the AC rotary machine 2, likewise to Embodiment 4.

In Embodiment 5, the control means 10B in Embodiment 4 is replaced with control means 10C, in which the start current command means 12B in Embodiment 4 is replaced with start current command means 12C. In the start current command means 12C, a d-axis start current command unit 19 is used, and the d-axis start current command id1* is fed from this d-axis start current command unit 19 to the current controller 20 through the d-axis changeover switch 18d of changeover means 18. This d-axis start current command unit 19 is fed with an external command io=0 for establishing the d-axis start current command id1*=0, and an angular frequency ω from the divider 46 of phase signal generation means 40. The others are the same in configuration as in Embodiment 4.

In a case where the absolute value of the angular frequency ω from the divider 46 is smaller than a predetermined value ωBASE, the d-axis start current command unit 19 brings the d-axis start current command id1* to zero on the basis of the external command io, that is, it establishes id1*=0. Besides, in a case where the absolute value of the angular frequency ω from the divider 46 is equal to or larger than the predetermined value ωBASE, the d-axis start current command unit 19 brings the d-axis start current command id1* to (A−B/ω) on the basis of the external command io.

These are expressed by the following formulas (10):

$$id1^*=0 \text{(for } |\omega|<\omega BASE)$$

$$id1^*=A-B/\omega \text{(for } |\omega|\geq\omega BASE) \quad (10)$$

Here, "A" and "B" denote constants, and ωBASE=B/A holds.

Owing to the use of this d-axis start current command unit 19, when the absolute value of the angular frequency ω is smaller than ωBASE, the synchronous machine 2S is efficiently started without feeding any wasteful current to the synchronous machine 2S in order to start this synchronous machine 2S, and when the absolute value of the angular frequency ω is equal to or larger than ωBASE, a magnetic flux weakening control is performed by setting (A−B/ω) at a negative value, whereby the voltage saturation of a power inverter 1 can be prevented. Incidentally, although the q-axis start current command iq1* is made zero in the same manner as in Embodiment 1, it can also be made a predetermined value other than zero.

Embodiment 6

Figure 6:
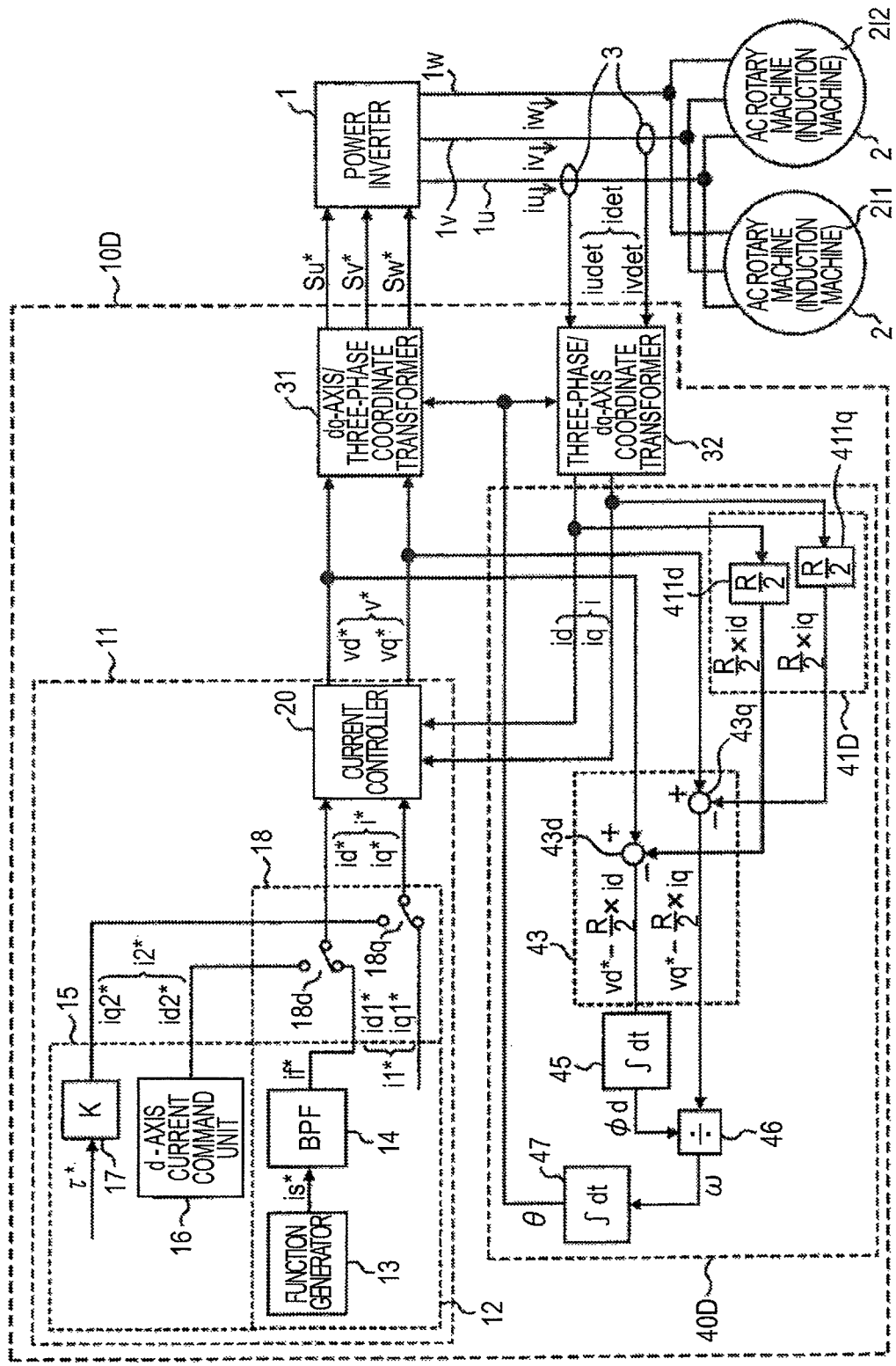
FIG. 6 is a block diagram showing Embodiment 6 of a control apparatus for an AC rotary machine according to this invention.

FIG. 6 is a block diagram showing Embodiment 6 of a control apparatus for an AC rotary machine according to this invention. Embodiment 6 is such that two AC rotary machines, concretely two induction machines 2I1 and 2I2 are connected to a power inverter 1 in parallel with each other. The induction machines 2I1 and 2I2 are three-phase induction motors whose ratings are equal to each other, and they are carried on, for example, an electric car so as to drive the electric car.

The induction machines 2I1 and 2I2 have armature resistances R which are equal to each other. Since these induction machines 2I1 and 2I2 are connected to the power inverter 1 in parallel to each other, the combined armature resistance thereof as seen from the power inverter 1 becomes (R/2). In Embodiment 6, the control means 10 in Embodiment 1 is replaced with control means 10D, in which the phase signal generation means 40 in Embodiment 1 is replaced with phase signal generation means 40D. This phase signal generation means 40D has a resistance drop calculation circuit 41D, which has a d-axis resistance drop calculator 411d and a q-axis resistance drop calculator 411q. The others are the same in configuration as in Embodiment 1.

The d-axis resistance drop calculator 411d is fed with the d-axis detection current id from the coordinate transformer 32, and it multiplies this d-axis detection current id by (R/2) so as to output a d-axis resistance drop {(R/2)×id}. The q-axis resistance drop calculator 411q is fed with the q-axis detection current iq from the coordinate transformer 32, and it multiplies this q-axis detection current iq by (R/2) so as to output a q-axis resistance drop {(R/2)×iq}. On the basis of the d-axis resistance drop and the q-axis resistance drop, the d-axis subtractor 43d delivers a subtraction output {vd*−(R/2)×id}, and the q-axis subtractor 43q delivers a subtraction output {vq*−(R/2)×iq}. Besides, the integrator 45 delivers an integral output ∫{vd*−(R/2)×id}dt, so that the division output ω of a divider 46 in Embodiment 6 becomes the following formula (11):

$$\omega = \int\{vd^*-(R/2)\times id\}dt \div \{vq^*-(R/2)\times iq\} \quad (11)$$

The phase signal generation means 40D in Embodiment 6 calculates the angular frequency ω in conformity with Formula (11), and the angular frequency of the AC output voltage of the power inverter 1 is controlled so as to become equal to this angular frequency ω. Also in Embodiment 6, the two induction machines 2I1 and 2I2 in free-run states can be stably started in the same manner as in Embodiment 1. In a case where three or more induction machines are connected to the power inverter 1 in parallel, the multiplication coefficient in the resistance drop calculation circuit 41D is adjusted in accordance with the number of the connected machines, whereby the three or more induction machines in free-run states can be stably started similarly.

Embodiment 7

Figure 7:
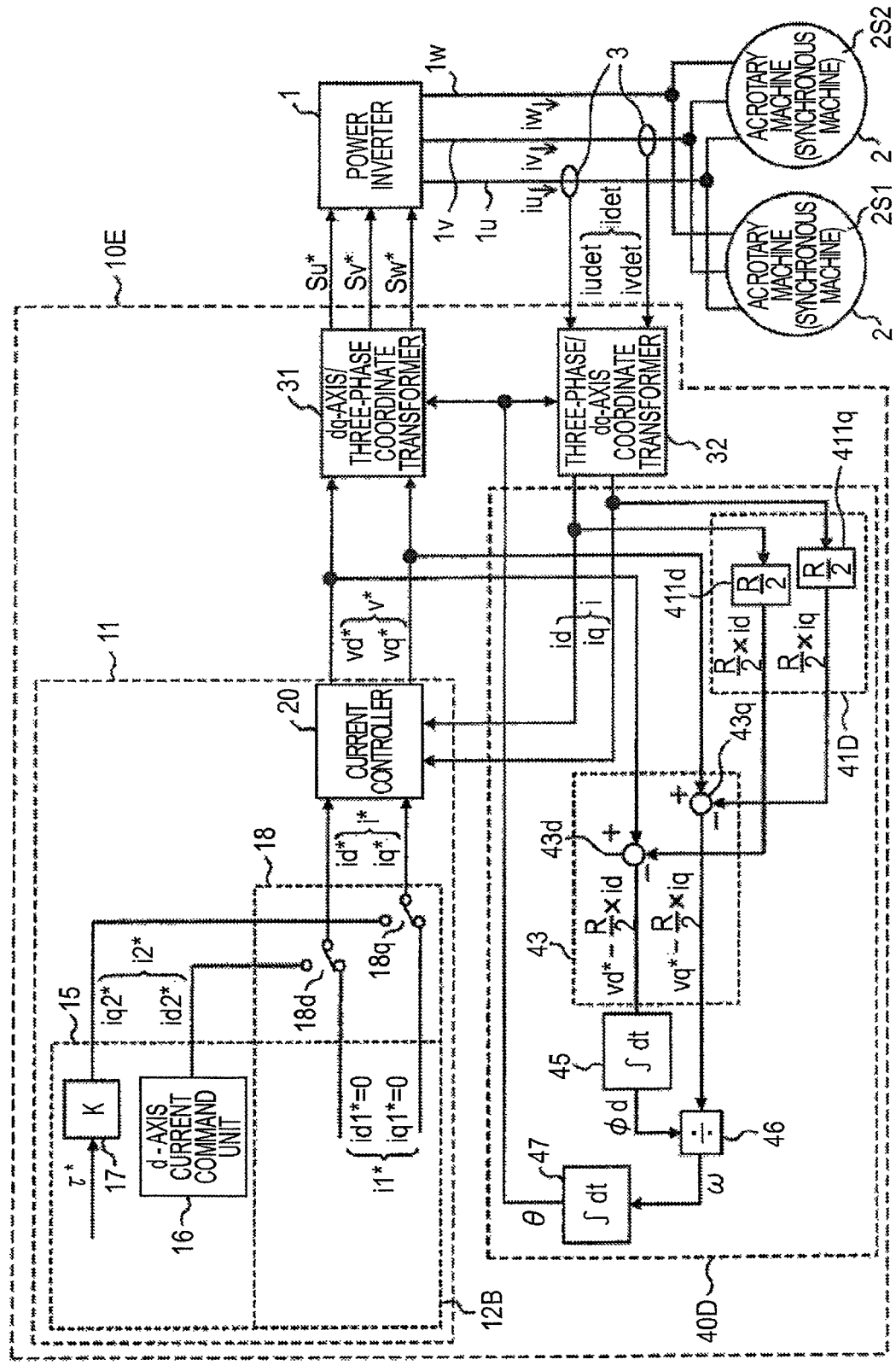
FIG. 7 is a block diagram showing Embodiment 7 of a control apparatus for an AC rotary machine according to this invention.

FIG. 7 is a block diagram showing Embodiment 7 of a control apparatus for an AC rotary machine according to this invention. Embodiment 7 is such that two AC rotary machines, concretely two synchronous machines 2S1 and 2S2 are connected to a power inverter 1 in parallel with each other. The synchronous machines 2S1 and 2S2 are, for example, three-phase synchronous motors whose ratings are equal to each other. With the use of the synchronous machines 2S1 and 2S2, the control means 10D in Embodiment 6 is replaced with control means 10E, in which the start current command means 12 of the control means 10D is replaced with start current command means 12B. This start current command means 12B is the same as in Embodiment 4. The others are the same in configuration as in Embodiment 6.

When, in starting the synchronous machines 2S1 and 2S2 which are in free-run states, the magnetic pole positions of the synchronous machines 2S1 and 2S2 have agreed, any circulating current does not flow between these synchronous machines 2S1 and 2S2. If the synchronous machines 2S1 and 2S2 have no load in the case of starting the synchronous machines 2S1 and 2S2 which are in the free-run states, a state where the circulating current does not flow between these synchronous machines 2S1 and 2S2 is a stable state, and the synchronous machines 2S1 and 2S2 are started in this stable state. In this case, a combined armature resistance seen from the power inverter 1 becomes (R/2), and hence, the two synchronous machines 2S1 and 2S2 being in the free-run states can be stably started in the same manner as in Embodiment 4, by employing the same phase signal generation means 40 as in Embodiment 6. In a case where three or more synchronous machines are connected to the power inverter 1 in parallel, the multiplication coefficient in the resistance drop calculation circuit 41D is adjusted in accordance with the number of the connected machines, whereby the three or more synchronous machines in free-run states can be stably started similarly.

INDUSTRIAL APPLICABILITY

A control apparatus for an AC rotary machine according to this invention is applied to a control apparatus for the AC rotary machine such as an induction machine or a synchronous machine.

The invention claimed is:

1. A control apparatus for an AC rotary machine, including:
    control means for generating a voltage command based on a current command, and for generating a switching command based on the voltage command;
    a power inverter which generates an AC output voltage that has an amplitude and an angular frequency controlled based on the switching command;
    at least one AC rotary machine which is connected to said power inverter; and
    a current detector which outputs a detection current based on an AC phase current that flows from said power inverter to said AC rotary machine, wherein
    said control means controls a start control for said AC rotary machine,
    said control means, in the start control, calculates a resistance drop component corresponding to a resistance drop of said AC rotary machine, based on the detection current, and adjusts the angular frequency of the AC output voltage based on a subtraction output obtained by subtracting the resistance drop component from the voltage command, and
    said control means, in a start period of the start control, adjusts amplitude of the AC output voltage so that amplitude of the AC phase current may change in conformity with a predetermined function and controls the angular frequency of the AC output voltage to be zero at a start time point of the start period.

2. The control apparatus for the AC rotary machine as defined in claim 1, wherein said control means, in the start control, adjusts output torque of said AC rotary machine based on the current command.

3. The control apparatus for the AC rotary machine as defined in claim 2, wherein said control means, in the start control, adjusts the output torque of said AC rotary machine to zero.

4. The control apparatus for the AC rotary machine as defined in claim 1, wherein said control means performs the start control when said AC rotary machine is in a free-run state.

5. The control apparatus for the AC rotary machine as defined in claim 1, wherein, when the voltage command contains a d-axis voltage command and a q-axis voltage command on orthogonal two-axis rotating coordinates which include a d-axis and a q-axis that rotate in synchronism with the angular frequency of the AC output voltage, said control means, in the start control, generates a d-axis resistance drop component and a q-axis resistance drop component corresponding to the resistance drop of said AC rotary machine, based on the detection current, and adjusts the angular frequency of the AC output voltage based on a d-axis subtraction output obtained by subtracting the d-axis resistance drop component from the d-axis voltage command, and a q-axis subtraction output obtained by subtracting the q-axis resistance component from the q-axis voltage command.

6. The control apparatus for the AC rotary machine as defined in claim 5, wherein said control means, in the start control, calculates magnetic flux amplitude of said AC rotary machine, based on the d-axis subtraction output, divides the q-axis subtraction output by the magnetic flux amplitude, and adjusts the angular frequency of the AC output voltage based on results of the division.

7. The control apparatus for the AC rotary machine as defined in claim 1, wherein
    said control means has a function generator, and a band-pass filter which extracts only a frequency bandwidth required for the start, from a start current command provided by said function generator,
    said control means outputs a predetermined function command from said band-pass filter as the current command, and
    said control means adjusts the amplitude of the AC output voltage based on the function command.

8. The control apparatus for the AC rotary machine as defined in claim 1, wherein said control means, in the start control, adjusts the amplitude of the AC output voltage so that the amplitude of the AC phase current may be made zero.

9. The control apparatus for the AC rotary machine as defined in claim 1, wherein said control means, in the start control, adjusts the amplitude of the AC output voltage so that the amplitude of the AC phase current may be made zero, when the angular frequency of the AC output voltage is equal to or lower than a predetermined value, and adjusts the amplitude of the AC output voltage so that the amplitude of the AC phase current may be made a predetermined magnitude, other than zero, when the angular frequency of the AC output voltage exceeds the predetermined value.

10. The control apparatus for the AC rotary machine as defined in claim 1, wherein said AC rotary machine is an induction machine.

11. The control apparatus for the AC rotary machine as defined in claim 1, wherein said AC rotary machine is a synchronous machine.

12. The control apparatus for the AC rotary machine as defined in claim 1, including, connected to said power inverter, a plurality of AC rotary machines that are connected in parallel.

* * * * *